Aug. 20, 1940.   L. L. LUDINGTON   2,212,348
DRIVE AND TIMING MECHANISM
Filed Aug. 14, 1937   3 Sheets-Sheet 1
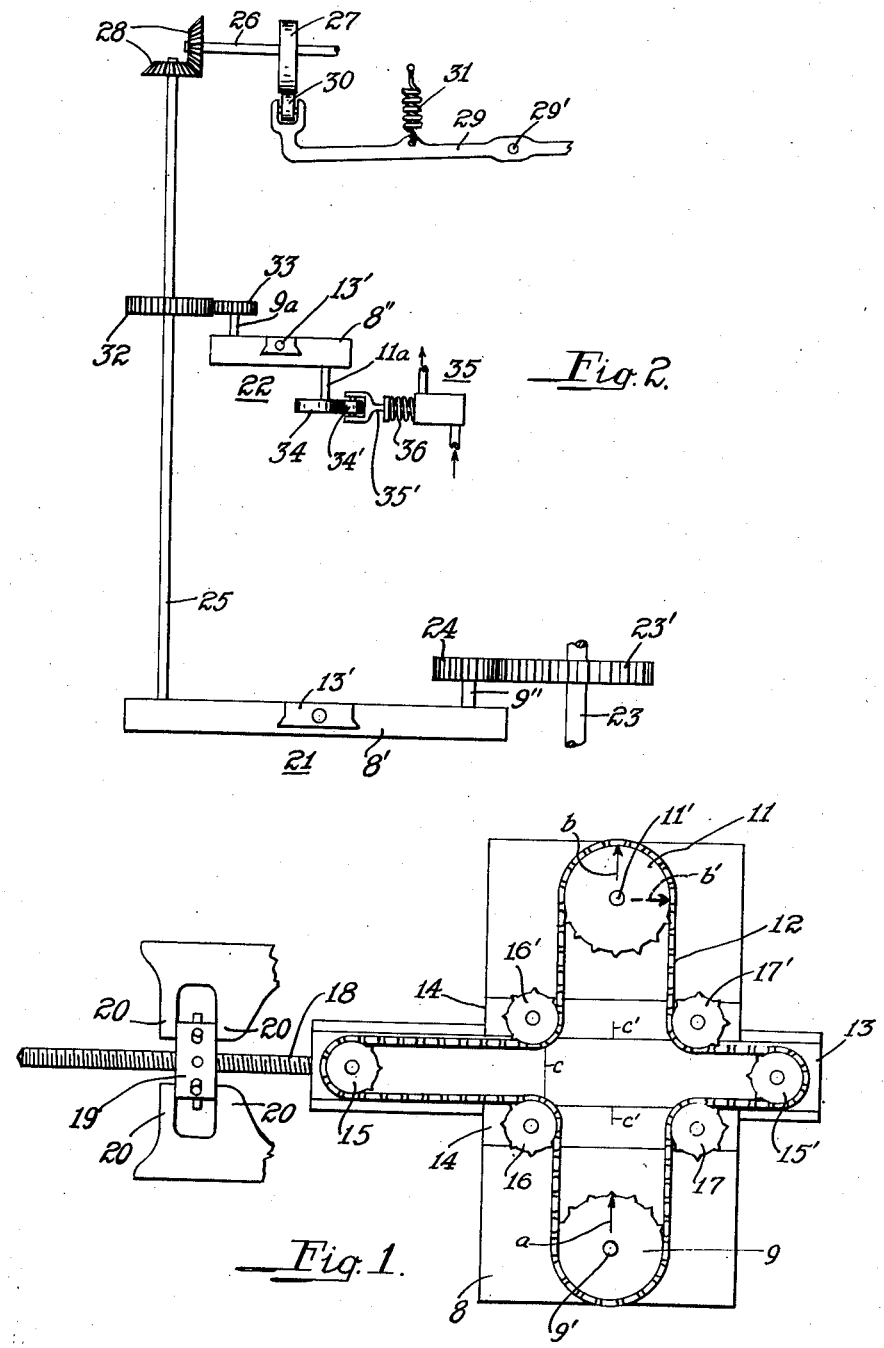
INVENTOR
Lawrence L. Ludington
By Green & McCallister
His Attorneys

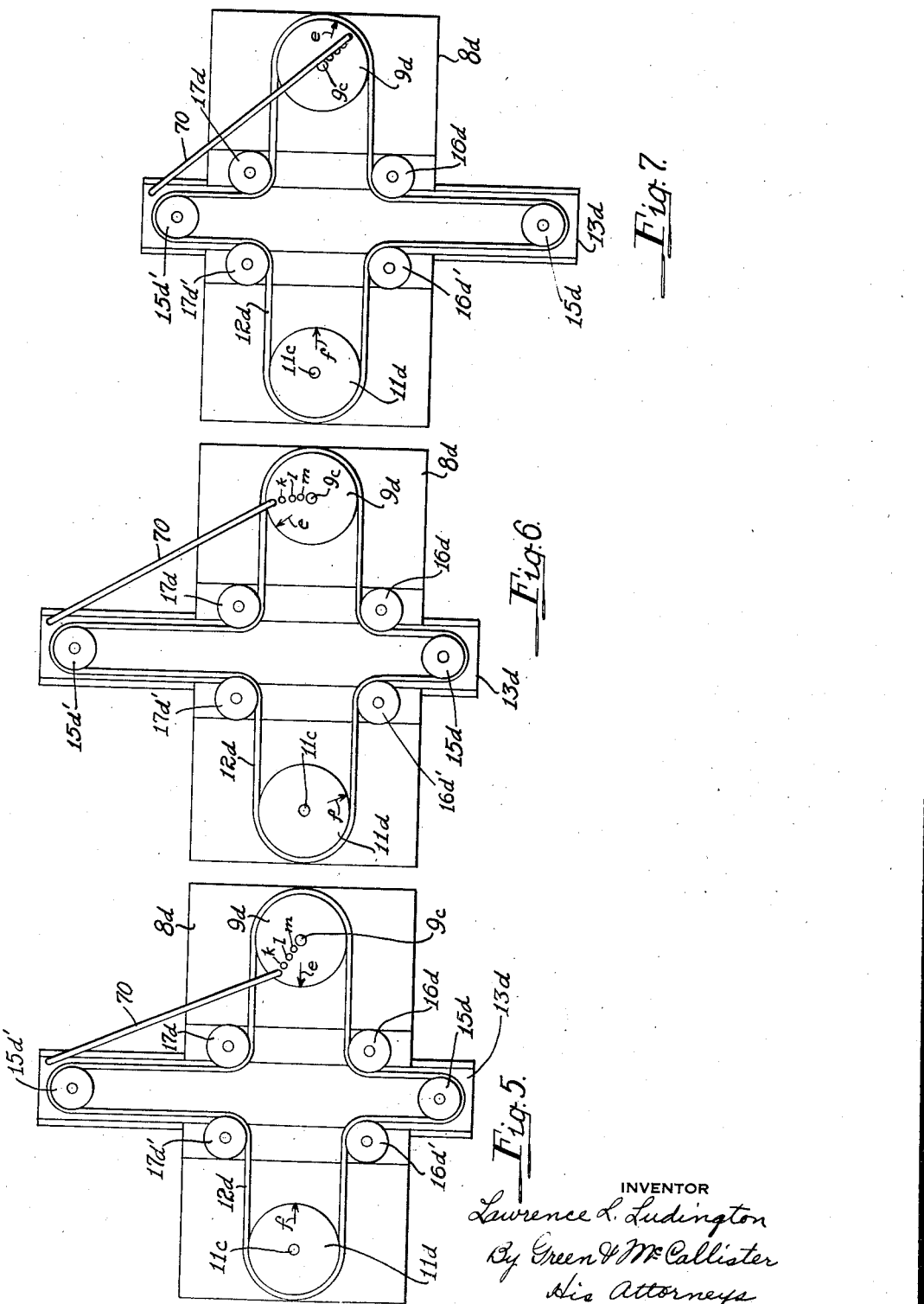

Patented Aug. 20, 1940

2,212,348

UNITED STATES PATENT OFFICE 2,212,348

DRIVE AND TIMING MECHANISM

Lawrence L. Ludington, Muncie, Ind., assignor to Ball Brothers Company, a corporation of Indiana Application August 14, 1937, Serial No. 159,065

4 Claims. (Cl. 74—242.10)

This invention relates to apparatus and procedure for driving a driven member and for varying the rotation of the driven member with relation to that of the driving member under such conditions that the time of operation of a part or mechanism actuated by the driven member may be varied, or the speed and/or the direction of rotation of the driven member may be varied, with relation to the driving member during each cycle of the driven member.

An object of this invention is to produce a simple and effective timing mechanism in which the time relation between a driving and a driven member may be accurately and effectively varied during the operation of both members.

A further object of the invention is to produce a mechanism including a driving and driven member in which simple and effective means are employed such that the operation of the driven member may be varied, i. e., advanced, retarded or reversed, with relation to the driving member, during the operation of both members.

A further object is to produce a simple and effective mechanical motion, including a driving and driven member, and such that a uniform speed of rotation of the driving member produces a variable speed of the driven member but under conditions such that each cycle of the driving member occasions a cycle of operation in the driven member.

A further object is to produce a simple and effective device including a driving and a driven member and wherein the speed and the direction of rotation of the driven member may be varied during each cycle.

These and other objects, which will be made more apparent throughout the further description of my invention, are attained by means of apparatus embodying the features herein described and illustrated and operating in accordance with the principles herein defined.

As disclosed herein, my invention involves employing a driving connection, such as chain and sprockets, between the driving and the driven member and under such conditions that a controlled slack is maintained within the chain and is shiftable from one side to the other around the sprocket associated with the driven member to thereby cause that member to move in response to the driving force, as transmitted by the chain, and as modified by the slack shifting force.

In the drawings forming a part hereof, Figure 1 is a diagrammatic plan view of an apparatus embodying my invention;

Fig. 2 is a diagrammatic view illustrating the application of my invention to the driving mechanism of a machine in which it is desirable to vary the time of operation of one part of the machine with relation to the drive for the machine, or in which it is desirable to vary the time of operation of one part of the machine with relation to another part thereof;

Figure 3:
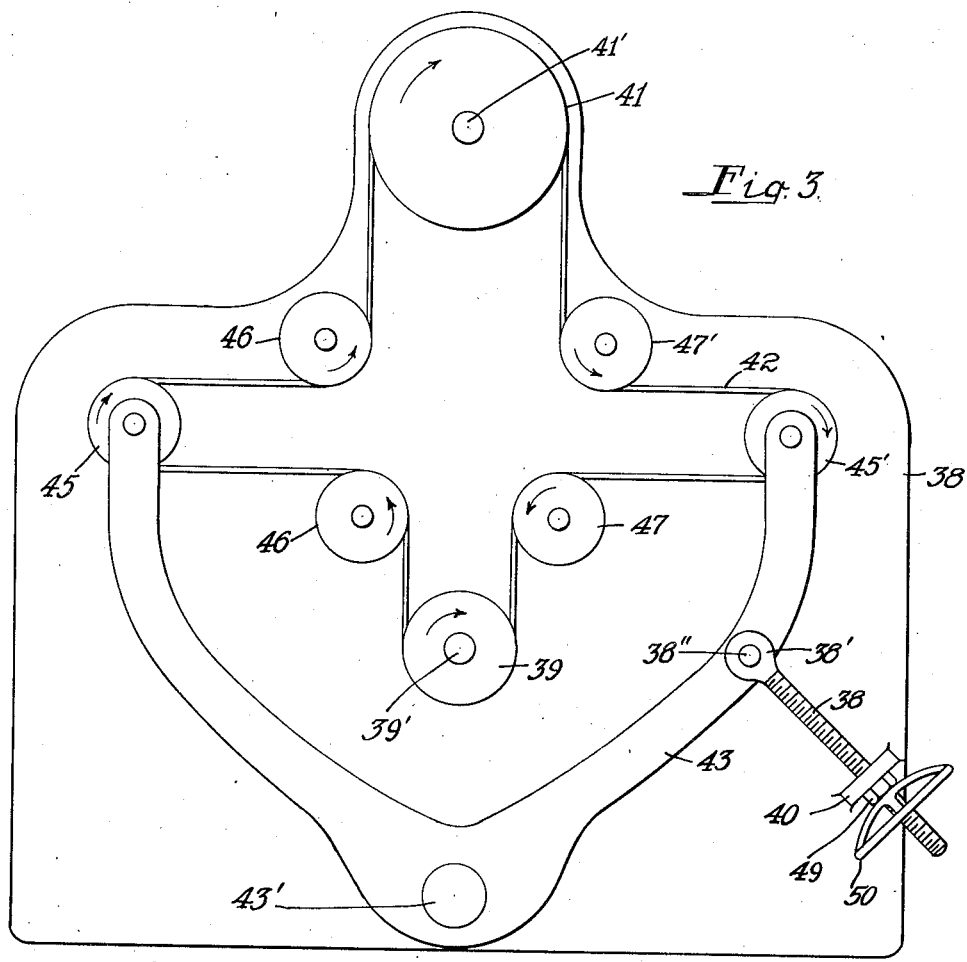
Fig. 3 is a plan view showing a modified form of the apparatus illustrated in Fig. 1.

Fig. 5 is a diagrammatic view illustrating a somewhat different embodiment of my invention, wherein a variable cyclic motion is imparted to the driven element by a uniformly rotating driving member and a mechanically actuated slide; and Figs. 6 and 7 are views corresponding to Fig. 5, but illustrating the apparatus in different positions for the purpose of disclosing the cyclic motion imparted to the driving mechanism by one adjustment of the mechanism there illustrated.

The embodiment of my invention illustrated in Fig. 1 consists essentially of a frame 8 on which a driving sprocket 9 is mounted. The sprocket 9 is rigidly mounted on a drive shaft 9', which is journalled in suitable bearings carried by the frame 8. The sprocket 9 is operatively connected to a driven sprocket 11 by means of a flexible connection, such as a continuous chain 12. The driven sprocket is rigidly mounted on a driven shaft 11', also suitably journalled in the frame 8, and which, through the agency of suitable connection, such as gears, cranks, eccentrics, etc., may be employed as the actuating mechanism of a device or devices constituting the operating part or parts of a machine or similar apparatus.

As illustrated, the chain 12 is much longer than is necessary for encircling the two sprockets 9 and 11 and the slack, occasioned by the excess length of the chain, is taken up by passing the chain around a system of idler sprockets so arranged that the slack may be controlled and shifted from one side to the other of the driven sprocket 11 for the purpose of advancing or retarding the driven member with relation to the driving member or for the purpose of modifying the movement of the driven member with relation to that of the driving member.

As shown in the drawings, a slide 13 is mounted on the frame 8 at a point intermediate the sprockets 9 and 11 and is supported by guides 14, also carried by the frame, and through which it is movable back and forth along a line extending at an angle to the line defined by the centers of the sprockets 9 and 11. In the illustrated embodiment the line of movement of the guide extends at right angles to the line defined by the centers of the sprockets 9 and 11, but this specific relationship is not essential. As shown, two idlers 15 and 15' are rotatably mounted in spaced relation on the slide 13 and are positioned in such relationship with sprockets 16, 16', 17, 17' (all rotatably mounted on the frame 8) that one leg of the chain is looped between the sprockets 16 and 16' so that it passes over the slide sprocket 15. The other leg of the chain is looped between the sprockets 17 and 17' and passes over the slide idler 15'. With this arrangement it is apparent that the chain extends from the drive sprocket 9, passes partially around the idlers 16, 15, 16', then partially around the driven sprocket 11 and partially around the sprockets 17', 15', 17 and back to the driving sprocket 9, it being of course understood that the chain is a continuous chain.

Inspection of Fig. 1 discloses that the chain exceeds the length necessary for constituting a simple driving connection between the sprockets 9 and 11, by about the lengths of the two loops occasioned by interposing the slide idlers 15 and 15' in the chain circuit. It will also be apparent that by shifting the position of the slide 13, one such loop is increased in length as the other is decreased in length, and that such a movement of the slide will rotate the driven sprocket 11 if the driving sprocket 9 is held stationary. From this it is apparent that with the apparatus illustrated, the driven sprocket 11 is capable of being rotated by the driving sprocket 9 and also by the shifting of the slide 13, and that consequently where the slide 13 is changed in position during rotation of the driving sprocket 9, the driven sprocket 11 is either advanced or retarded, with relation to the driving sprocket depending upon the direction of motion of the slide and the direction of rotation of the driving sprocket.

If the driving sprocket 9 is rotating clockwise and the slide 13 is held stationary, the driven sprocket 11 will also rotate clockwise and, in the illustrated embodiment, the speed of rotation of the driven sprocket will correspond to that of the driving sprocket, since both sprockets are shown as of the same pitch diameters. If under these conditions of sprocket motion, the slide 15 is moving toward the right, the loop passing around the slide sprocket 15' will be increased in length and the loop passing around the slide sprocket 15 will be correspondingly reduced in length, with the result that the slide shifting operation actually rotates the driven sprocket 11 and, under the conditions assumed, rotates it in a clockwise direction and therefore advances its rotational position with relation to the driving sprocket 9. The amount of this rotational advance corresponds to the amount of chain slack which is shifted from one side of the driven sprocket to the other. From this it will be apparent that a reverse movement of the slide 13, other assumed conditions remaining the same, will retard or even reverse the rotation of the driven sprocket 11, with the result that the rotational position of the driven sprocket will be moved back or retrojected with relation to the driving sprocket 9. The amount of this retrojection will depend upon the extent of movement of the slide or the amount of chain slack which is actually moved from the right to the left of the driven sprocket 11.

During the slide shifting operation the movement of the chain 12 around the center of rotation of the driven sprocket 11 equals the algebraic sum of the lineal movement of the chain around the center of rotation of the driving sprocket 9 and the lineal movement of the slide, where a slide movement from left to right is designated as a plus movement, a slide movement from right to left a negative (minus) movement and the lineal movement of the chain about the center of rotation of the sprocket 9 (while sprocket 9 is rotating in a clockwise direction) is designated as a plus movement. Consequently, under conditions last assumed, the rotation of the driven sprocket 11 may be momentarily retarded, stopped or reversed, depending upon the speed at which the slide is shifted from the right to the left.

Where the apparatus illustrated is employed for the purpose of timing the operation of one device with relation to the operation of another device, the rate at which the slide is shifted is unimportant, but the direction and the extent of the shift is important, because the timing is accomplished by either advancing or moving back the angular or rotational position of the sprocket 11 with relation to the angular or rotational position of the driving sprocket 9. It will be apparent that in the apparatus illustrated, the driven sprocket 11 rotates in the same direction and at the same speed as the driving sprocket 9, and that a shifting of the slide 13 from left to right will rotate the driven sprocket 11 in a clockwise direction even when the driving sprocket 9 is held stationary. From this it is apparent that such a shifting of the slide 13 while the driving sprocket 9 is rotating in a clockwise direction, will momentarily accelerate the speed of rotation of the driven sprocket 11 and thus advance the rotational position of that sprocket with relation to the rotational position of the driving sprocket 9. For the purpose of illustrating the effect of shifting the slide 13 I have disclosed the sprocket 9 as provided with a full line arrow $a$ and the sprocket 11 as provided with a full line arrow $b$ and these arrows are in alignment. If the sprocket 9 is held stationary and the slide 13 is shifted from the left to the right, the sprocket 11 will be rotated by the chain 11 in a clockwise direction and to some position such that the arrow $b$ will be turned to a position as indicated by the dotted lines $b'$. A shifting of the slide 13 in the opposite direction—i. e., from right to left—will increase the size of the chain slack-loop on the left-hand side of the device and will thus reverse the rotation of the driven sprocket 11 while the driving sprocket 9 is being held stationary. From this it is apparent that an adjustment of the position of the slide, during the rotation of the driving sprocket 9, either accelerates or retards the rotation of the driven sprocket 11 and thus either advances or retrojects the rotational position of that sprocket with the driving sprocket.

In Fig. 1 I have diagrammatically illustrated means for shifting or adjusting the slide 13 and holding it in the adjusted position. As there illustrated, the slide is provided with a threaded shank 18, which passes through and is engaged by a capstan nut 19 so supported between stationary lugs 20 that it is capable of turning about, but is prevented from moving longitudinally with relation to the axis of the shank 18. With this arrangement the position of the slide 13 may be adjusted by turning the nut 19 and the slide will be held in the adjusted position by the co-operation of the nut 19 with its confining lugs 20, where the pitch of the nut engaging thread with which the shank 18 is provided, is such as will prevent a force applied longitudinally of the shank from rotating the nut 19.

In Fig. 2 I have diagrammatically illustrated an arrangement of timing mechanisms such that the time of operation of two devices may be varied with relation to each other and each or both may be varied with relation to a third device while all such devices are in operation. Timing devices, similar in all respects to the timing device shown in Fig. 1, are indicated diagrammatically at 21 and 22 in connection with an assembly of operating shafts, gears and cams. For example, the shaft 23 may be assumed to be an operating shaft for a machine not illustrated. This shaft, however, drives the sprocket of the timing device 21, corresponding to the so called driving sprocket 9 of Fig. 1. For the purpose of illustration I have shown the shaft 23 provided with a gear 23', which meshes with and drives a pinion 24, rigidly mounted on the drive shaft 9'' of the last mentioned sprocket. I have also illustrated a shaft 25, which corresponds to the shaft 11' of Fig. 1, and is therefore driven by the sprocket corresponding to the so called driven sprocket 11 of Fig. 1.

With the arrangement of apparatus thus diagrammatically illustrated it will be apparent that a shifting of the slide 13', forming an element of the timing mechanism 21, will advance or retard the rotation of the shaft 25 with relation to the rotation of the shaft 9'' and consequently with relation to the shaft 23. The shaft 25 is diagrammatically illustrated as driving a cam shaft 26 provided with a cam 27; the drive being accomplished through a pair of bevel gears 28. A lever 29, fulcrumed at 29', is shown as provided with a cam roller 30, which is held against the cam 27 by means of a spring 31. Under such conditions the lever is oscillated by the rotation of the cam 29 and its oscillations may be timed, relatively to the rotation of the shaft 23, by shifting the slide 13' forming an element of the timing mechanism 21.

I have also shown the shaft 25 as provided with a gear 32, which meshes with and drives a pinion 33 rigidly mounted on a shaft 9a corresponding to the shaft 9' of Fig. 1 and forming a part of the timing mechanism 22. The shaft 11a of this timing mechanism 22 corresponds to the shaft 11' of Fig. 1 and consequently is driven by the sprocket of the timing mechanism 22 corresponding to the driven sprocket 11 of Fig. 1. A shifting of the slide 13'' of the timing mechanism 22 will, therefore, advance or retard the rotation of the shaft 11a with relation to the shaft 9a or with relation to the shaft 25 or the shaft 23.

The shaft 11a is shown as provided with a cam 34 and this cam actuates a valve mechanism, diagrammatically shown at 35, through the agency of a cam roller 34' carried by a valve stem 35' and held against the cam 34 by means of a coil spring 36.

As has been stated, a shifting of the slide 13', forming a part of the timing mechanism 21, will advance or retard the shaft 25 with relation to the shaft 23, consequently it will also advance or retard the time of operaton of the valve mechanism 35 with relation to the rotation of the shaft 23. It is, therefore, apparent that the timing mechanism 21 may be employed for varying the time of operation of both the lever 29 and the valve mechanism 35. By interposing the timing mechanism 22 between the shaft 25 and the cam shaft 11a, the time of operation of the valve mechanism 35 may also be varied by shifting the slide 13'', forming an element of the timing mechanism 22. Thus it is apparent that the timing mechanism 22 may be employed for timing the valve mechanism 35 with relation to the rotation of the shaft 23, and with relation to the shaft 25 and that, therefore, the time of operation of the valve mechanism 35 may be varied with relation to the time of operation of the lever 29 by shifting the slide 13''.

It will also be apparent that by proper adjustments of the slides 13' and 13'', the time of operation of the lever 29 may be varied, with relation to the rotation of the shaft 23, while the time of operation of the valve mechanism 35 is unchanged. Thus, a shifting of the slide 13' will simultaneously change the time of operation of both the lever 29 and the valve mechanism 35 with relation to the rotation of the shaft 23 but without changing the time relationship between the operation of these two mechanisms. On the other hand, a shifting of the lever 13'', forming a part of the timing mechanism 22, will advance or retard the time of operation of the valve mechanism 35 both with relation to the rotation of the shaft 23 and with relation to the operation of the lever 29, and that all of these variations in timing may be accomplished while the associated machines are operating.

It will be apparent that my invention involves various arrangements of driving and driven sprockets, chain and idler sprockets and that the relative diameters of the driving and driven sprockets may be varied in accordance with the necessity of each particular case. It will also be apparent that the particular procedure and particular means for adjustably shifting chain slack from one side to the other of the driven sprocket is, to some extent, unimportant and for that reason I have illustrated in Figs. 3 and 4, two different modifications of devices embodying my invention, although it will be understood that various other changes in size, relative proportions and form of parts may be resorted to without departing from the spirit and scope of my invention.

In the mechanism disclosed in Fig. 3, the so called driving sprocket 39 is mounted on a drive shaft 39', which is journaled on a suitable frame 38. A so called driven sprocket 41 is mounted on and drives a shaft 41' which is also journaled on the frame 38. A chain 42 forms the driving connection between the sprockets 39 and 41 and, as in Fig. 1, this chain is guided by idler sprockets 45, 45', 46, 46', 47 and 47'. All of these idler sprockets except the sprockets 45 and 45' are rotatably mounted on the frame and rotate in fixed positions with relation to the frame. The sprockets 45 and 45' are, however, mounted on a yoke 43, which is pivotally mounted on the frame 38 by means of a shaft 43'. Thus it is apparent that the yoke 43 performs the function of the slide 13 illustrated in Fig. 1 and that chain slack is shifted from one side to the other of the sprocket 41 by appropriately moving the yoke about its fulcrum shaft 43'. It will also be noted that the so called driven sprocket 41 is of a substantially greater diameter than the driving sprocket 39 and that, therefore, its speed of rotation will be slower than the speed of rotation of the sprocket 39 during normal operation.

I have discovered that the rotation of the driving sprocket (9 or 39) imparts a shifting force to the carriage (13 or 43) on which the laterally movable sprockets (15—15' or 45—45') are supported; that when the driving sprocket is driven in a clockwise direction (Fig. 1 or Fig. 3) this shifting force tends to move the carriage (13 or 43) from right to left, and conversely, when the sprocket is driven in a counter-clockwise direction the shifting force tends to shift the carriage from left to right.

In Fig. 3 I have assumed that driving sprocket 39 will always be driven in a clockwise direction and consequently I have provided means for adjusting the position of the yoke 43, which contemplates a shifting force on that yoke tending to move it from right to left about the fulcrum shaft 43'. As there shown, I have provided a screw threaded shank 38, provided at one end with a clevis shaped end 38' which is pivotally secured to the yoke by means of a pin 38''. The threaded shank extends through a lug 40 rigidly mounted on the frame 8 and is provided on its projecting end with a nut 49. During the rotation (in a clockwise direction) of the sprocket 39, the shifting force interposed on the yoke holds the nut 39 against the lug 40, consequently the position of the yoke can be adjusted by threading the nut to different positions along the shank. For convenience, in accomplishing this I have shown the nut as provided with a hand wheel 50.

Figure 4:
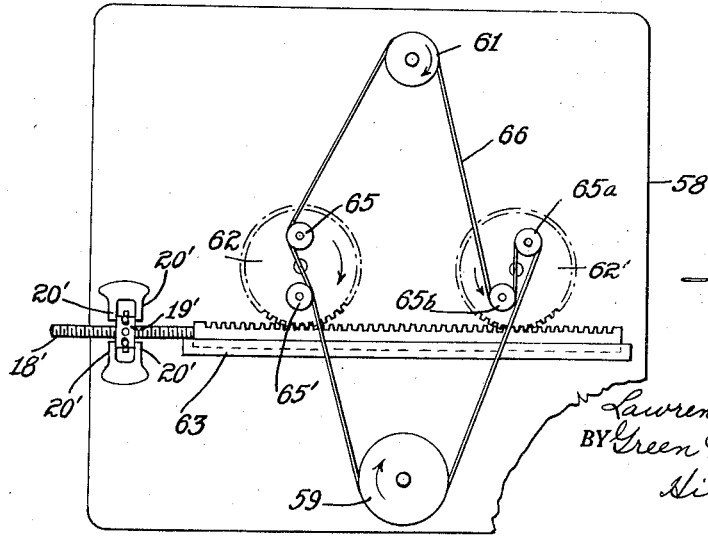
Fig. 4 is a still further modified form of apparatus in which all the parts are diagrammatically shown.

The mechanism shown in Fig. 4 is similar in function to the mechanism shown in Figs. 1 and 3. In this case, however, the driving sprocket 59 is of substantially larger diameter than the driven sprocket 61. Both these sprockets are rigidly mounted on shafts journaled in a frame 58. I have also illustrated two gears 62 and 62' journaled on the frame 58 and both meshing with an adjustable rack 63. Two sprockets 65 and 65' are rotatably mounted on the gear 62 in spaced relation. Similar sprockets 65a and 65b are rotatably mounted in spaced relation on the gear 62' and a chain 66 extends around the sprockets 59 and 61 and is interlaced with each pair of sprockets carried by the wheels 62 and 62'.

From the foregoing it will be apparent that as the rack 63 is shifted from one position to the other, both gears 62 and 62' are simultaneously rotated in the same direction and that, therefore, the positions of the sprockets carried by them are changed. The arrangement is such that during such a shifting of the rack and such a turning of the gears, the slack loop of the chain 66 is increased on one side of the driven sprocket 61 while it is simultaneously decreased on the other side of that sprocket by the change in the relative positions of the idler sprockets 65, 65', 65a and 65b.

In Fig. 4 I have shown the rack 63 as provided with a shifting means similar in function and form to the slide shifting means illustrated in Fig. 1. It includes a threaded shank 18' rigidly secured to the rack 63 and provided with a nut 19' threaded thereon and held against substantial longitudinal movement by lugs 20' formed on the frame 58.

In Figs. 5–7 I have shown what may be termed a functional modification of my invention. For the sake of simplicity of description, the mechanism disclosed in each of these figures is substantially similar to the mechanism illustrated in Fig. 1. The invention, however, is in no sense limited to a timing device, but broadly involves a mechanical motion in which the slack shifting operation heretofore described is accomplished mechanically and in regular cycles, with the result that a cyclic operation is imposed upon the so-called driven sprocket, although the movement or sequence of movements imparted to the driven sprocket may differ depending upon the arrangement of apparatus or apparatus parts.

In Fig. 5 the mechanism is provided with a frame 8d on which a driving sprocket 9d and its mounting shaft 9c are journaled. A driven sprocket 11d is also rotatably mounted on the frame and drives a shaft 11c. A chain 12d forms a driving connection between the sprockets mentioned and, as in Fig. 1, the slack loops of the chain are controlled by idler sprockets 15d, 15d', 16d, 16d', 17d and 17d'. The sprockets 15d and 15d' are rotatably mounted on a shiftable carriage or slide 13d. This slide is adapted to be shifted mechanically and in the drawings means for accomplishing this is diagrammatically shown in the form of a rod 70, which is pivotally secured to the driving sprocket 9d and also the slide 13d.

For the purpose of describing the effect on the sprocket 11d of subjecting it to the driving force of the sprocket 9d, as transmitted through the chain 12d, and the force transmitted to the chain by reason of a mechanical shifting of the slide 13d, I have illustrated one arrangement of parts that may be employed and I have assumed that the driving sprocket 9d is rotating at a constant speed in a clockwise direction. Figs. 5, 6 and 7 indicate the relative positions of the two sprockets 9d and 11d at selected intervals during something more than a half turn of the driving sprocket 9d.

In Fig. 5 the parts are shown in the positions such that the slide 13d has just about reached the upper end of its travel, but before its direction of motion is reversed. For the purposes of description the arrow e represents a point on the sprocket 9d and the arrow f represents a point on the sprocket 11c when the parts are in the positions described. As the sprocket 9d turns, in a clockwise direction, to a position such that the arrow e is moved to the position shown in Fig. 6, the slide 13d has not only reached the top of its stroke but has just started on its down stroke. During this period the driven sprocket 11d has turned in a clockwise direction to a position such that its arrow f is located as indicated in Fig. 6. It will be apparent that this movement of the sprocket 11d has been effected almost wholly by the driving effect of the sprocket 9d as transmitted through the chain 12d and is therefore in a clockwise direction and at a rate approximately equal to the rate of rotation of the sprocket 9d.

As the sprocket 9d moves (in a clockwise direction) from the position shown in Fig. 6 to a position such that the arrow e is advanced to the position shown in Fig. 7, the slide 13d is shifted to the bottom of its stroke. During this movement the driven sprocket 11d is actuated by the combined effect of the rotation of the sprocket 9d and the movement of the chain 12 occasioned by the shifting of the slide 13d, with the result that it (sprocket 11d) moves in a counter-clockwise direction and to a position such that its arrow f again occupies the starting position, i. e., the position shown in Figs. 5 and 7.

As the driving sprocket 9d continues its rotation in a clockwise direction and moves back to the position illustrated in Fig. 5, the slide 13d is moved through the substantial portion of its upward stroke, with the result that the sprocket 11d again moves in response to the chain travel occasioned by the combined effect of the rotating sprocket 9d and the upwardly moving slide 13d. This combined effect causes the sprocket 11d to move in a clockwise direction but at approximately twice the speed of rotation of the sprocket 9d and with the result that it, after completing an entire revolution in a clockwise direction, again occupies the position illustrated in Fig. 5.

Thus it is apparent that during each of the periods above designed, the lineal travel of the chain 12d equals the algebraic sum of the slide movement and the lineal travel of the chain 12d around the center of rotation of the driving sprocket 9d, where the various movements are designated as plus and minus movements as previously described. It will also be apparent that the cycle of the driven sprocket 11d corresponds with the cycle of slide movement and that the movement or the sequence of movements of the sprocket 11d during each cycle will depend upon the relationship of the movements of the slide and the driving sprocket. With the arrangement of apparatus disclosed in Figs. 5–7, the driven sprocket 11d completes a cycle while the driving sprocket 9d turns through one revolution, but this is because the slide 13d is driven by the driving sprocket and its cycle. It is, of course, apparent that the slide 13d need not be actuated by the driving sprocket 9d and it will also be apparent that the character of movement of the sprocket 11d during each of its cycles will depend upon the relation of the lineal movement imparted to the chain 12d by the sprocket 9d and the slide 13d. In the apparatus as illustrated, each cycle of the driven sprocket 9d includes a clockwise movement, a counter-clockwise movement and then an accelerated clockwise movement.

In Fig. 5 I have shown three additional pivot points on the sprocket 9d for the rod 70. These pivot points are indicated by the small circles k, l, m. It will be apparent that the movement of the sprocket 11d in response to the rotation of the sprocket 9d will differ when each such pivot point is employed as the point of connection between the rod 70 and the sprocket 9d and that the character of the movement will depend upon which such pivot is employed as the point of connection. For example, if the rod 70 is pivotally connected to the sprocket 9d at the point m, a relatively small throw will be imparted to the guide 13d during each rotation of the sprocket 11d, with the result that the sprocket 11d will move continuously in a clockwise direction, but its rate of rotation will not be uniform.

From the foregoing it will be apparent that I contemplate actuating the driven sprocket 11d by the combined action of a rotating force applied to the driving sprocket and a shifting force applied to the slide or carriage 13d and that, therefore, the driven sprocket 11d will move in response to these combined forces and that the character of its motion can be controlled by appropriately selecting the rate of rotation of the sprocket 9d and the character of reciprocatory motion imparted to the slide 13. That is to say, the sprocket 9d need not rotate at a uniform rate and the slide 13d need not be actuated by a crank shaft connection such as illustrated. A variable face cam or other equivalent means may be employed for actuating the slide.

It will be apparent to those skilled in the art that the apparatus disclosed by the drawings is illustrative only and that various changes, modifications, additions and omissions may be made therein without departing from the spirit and scope of the invention as defined by the appended claims.

What I claim is:

1. In a variable motion device, a rotatable driving member, a rotatable driven member spaced therefrom, an endless flexible connection of a length substantially greater than twice the distance between said members and constituting a driving connection therebetween, slack loop controlling means comprising two idlers located in spaced relation with the axes of rotation thereof located in fixed relation to each other and movable with relation to the axes of rotation of said members along the line substantially defined by their centers of rotation, means for moving such idlers to different positions along such line and means maintaining said connection in substantially constant looped relationship with at least one of said members.

2. In an apparatus of the character described, a driving sprocket, a driven sprocket spaced therefrom, an endless chain constituting a driving connection between said sprockets and of a length substantially greater than twice the distance between the sprockets and slack loop controlling means comprising four idlers located in spaced relation engaging the outer face of said chain and with the axes of rotation thereof located in fixed relation with the axes of rotation of said sprockets and two idlers engaging the inner face of said chain, spaced one from the other and so mounted that they are movable with relation to said sprockets along a line substantially defined by their axes of rotation.

3. In an apparatus of the character described, a driving sprocket, a driven sprocket spaced therefrom, an endless chain constituting a driving connection between said sprockets and of a length substantially greater than twice the distance between the sprockets and slack loop controlling means comprising four idlers located in spaced relation, engaging the outer face of said chain and with the axes of rotation thereof located in fixed relation to the axes of rotation of said sprockets and two idlers engaging the inner face of said chain, spaced one from the other and so mounted that they are movable with relation to said sprockets along a line substantially defined by their axes of rotation, in combination with means actuated by one of said sprockets for so moving said last mentioned idlers.

4. In an apparatus of the character described, a rotatable driving sprocket, a rotatable driven sprocket spaced therefrom, uniformly rotating means actuating said driving sprocket, an endless chain constituting a driving connection between said sprockets and of substantially greater length than twice the distance between the same, slack shifting means for increasing the slack loop of said chain on one side of the driven sprocket while simultaneously decreasing the slack loop on the other side thereof comprising a plurality of chain positioning idlers engaging said chain and means actuated by said driving means for actuating two such idlers to cause said driven sprocket to move in opposite directions during each rotation of said driving sprocket.

LAWRENCE L. LUDINGTON.